United States Patent Office 3,528,844
Patented Sept. 15, 1970

3,528,844
RADIATION-CURABLE-VINYL RESIN
PAINTS AND COATED ARTICLE
William J. Burlant, Detroit, Mich., and Clement R. Taylor, Boise, Idaho, assignors to Ford Motor Company, Dearborn, Mich., a corporation of Delaware
No Drawing. Continuation-in-part of application Ser. No. 479,612, Aug. 13, 1965. This application Mar. 21, 1969, Ser. No. 809,380
Int. Cl. C08f 1/24, 3/42
U.S. Cl. 117—93.31                       15 Claims

ABSTRACT OF THE DISCLOSURE

An article of manufacture having a coating of paint adhered to an external surface thereof is prepared by applying to a substrate a liquid coating of film-forming solution of vinyl monomers and a unique copolymer of vinyl monomers and then crosslinking the vinyl monomers with this copolymer by ionizing radiation, said copolymer being an alpha-beta olefinically unsaturated polymer wherein the concentration of alpha-beta olefinic unsaturation units is limited to the range of about 0.5 to about 5, preferably about 0.5 to about 3 per 1,000 units molecular weight.

---

This application is a continuation-in-part of copending application Ser. No. 479,612 filed Aug. 13, 1965, now abandoned.

This invention relates to the art of coating and is primarily concerned with method and means for providing articles of manufacture, particularly wood, metal and shaped polymeric surfaces thereof with decorative and weather resistant coatings, including improved paints for such purpose, their preparation, application to a substrate and polymerization thereon. More particularly, this invention relates to an article of manufacture having an adherent coating of paint on an external surface thereof prepared by applying to a substrate a liquid coating of film-forming solution of vinyl monomers and a unique copolymer of vinyl monomers and then crosslinking the vinyl monomers with this copolymer by ionizing radiation, said copolymer being an alpha-beta olefinically unsaturated polymer wherein the concentration of alpha-beta olefinic unsaturation units is limited to the range of about 0.5 to about 5, preferably about 0.5 to about 3 per 1,000 units molecular weight.

The vinyl resins employed here are prepared by copolymerization of various vinyl monomers. At least a major portion of the constituent monomers are acrylic monomers or a combination of acrylic monomers and vinyl hydrocarbon monomers. A minor proportion of the constituent monomers may be other than vinyl monomers, e.g. allylic compounds. In a preferred embodiment, the copolymers are formed exclusively from acrylic monomers and are hereinafter referred to as "acrylic resins." The term "acrylic monomer" as used herein means an alpha-beta, monounsaturated, monocarboxylic acid or ester thereof and includes, but not by way of limitation, acrylic acid, alkacrylic acids, e.g. methacrylic acid, monohydric and polyhydric alcohol esters of acrylic and alkacrylic acids other oxygenated derivatives of acrylic acid and alkacrylic acids, e.g. glycidyl methacrylate, hydroxyethyl methacrylate, hydroxypropyl methacrylate, etc., halogenated derivatives of the same, e.g. chloroacrylic acid and esters thereof, and diacrylates and dimethacrylates, e.g. ethylene glycol diacrylate.

The vinyl resins employed herein, including the aforementioned acrylic resins, have average molecular weights in excess of 1,000 and may have molecular weights as high as 1,000,000 advantageously in the range of about 5,000 to about 50,000, and preferably in the range of about 5,000 to about 25,000, particularly in those applications in which the paint is applied by conventional spray methods.

The paint binder solution advantageously contains about 15 to about 85, preferably about 30 to about 70 weight percent of the vinyl resin and about 85 to about 15, preferably about 70 to about 30, weight percent vinyl monomers. The free monomers of the solution may be the same or different vinyl monomers with respect to the vinyl monomers employed in the preparation of the vinyl resin of the binder solution. In one embodiment, the vinyl monomers of the paint binder solution are a mixture of about 30 to 70, advantageously 40 to 60, and preferably about 45 to about 55, weight percent acrylic monomers with the balance made up of non-acrylic monomers, preferably vinyl hydrocarbon monomers. In another embodiment, the vinyl monomers of the paint binder solution are exclusively acrylic monomers. In another embodiment, the vinyl monomers of the paint binder solution are exclusively vinyl hydrocarbons. The respective quantities of such monomers may be adjusted to fit the individual need.

The binder is preferably applied to the substrate and cured thereon as a continuous film of substantially even depth, preferably a depth in the range of about 0.1 to about 4.0 mils depending upon the substrate and the intended end use of the coated product. The paint binder may be applied to the substrate by conventional spray techniques, brushing, roll coating, flow coating, dip coating, or by the method commonly termed the silk screen process with appropriate adjustment in viscosity.

The viscosity of the binder is adjusted by varying the molecular weight of the resin or resins and/or by varying the relative concenrations of the resin component and/or by varying the relative concentrations of dissimilar monomers within the monomer component. The binder may be applied to the substrate essentially free of nonpolymerizable organic solvents and/or diluents or it may be applied with such solvents and/or diluents in a method wherein the solvent and/or diluent is flashed off prior to polymerization.

The films formed of the paints of this invention are cured with ionizing radiation at relatively low temperatures, e.g. room temperature (20° to 25° C.) or a temperature between room temperature and that temperature at which significant vaporization of its most volatile component is initiated, ordinarily between 20° C. and 75° C. The radiation energy is applied at dose rates of about 0.1 to about 100 mrad per second upon a preferably moving workpiece with the coating receiving a total dose in the range of about 0.1 to about 100, preferably about 1 to about 25, commonly about 8 to about 15, mrad.

In this application the term "paint" is meant to include finely ground pigment and/or filler in the binder, the binder without pigment and/or filler or having very little of the same, which can be tinted if desired, and other surface coating compositions containing the binder which might be considered to be broadly analogous to enamel, varnish, or lacquer bases. Thus, the binder which is ultimately converted to a durable film resistant to conventional curing, can all be or virtually all that is used to form the film, or it can be a vehicle for pigmentary and/or mineral filler material.

The term "ionizing radiation" as employed herein means radiation having sufficient energy to remove an electron from a gas atom, forming an ion pair, and hence radiation with eenrgy of, or equivalent to about 5,000 electron volts. The preferred method of curing film of the instant paint binders upon the substates to which they have been applied is by subjecting such films to a beam of polymerization effecting electrons which at its source of emission is within the range of, or equivalent to, 150,000 to 450,000 electron volts. In this method of curing, it is preferred ot employ a minimum of 25,000 electron volts per inch of distance between the radiation emitter and the workpiece where the intervening space is occupied by air. Adjustment is made for the relative resistance of the intervening gas which is preferably an oxygen-free, inert gas such as nitrogen or helium.

This invention will be more fully understood from the following illustrative examples:

EXAMPLE 1

An acrylic paint binder resin is prepared from the following ingredients in the manner hereinafter set forth:

| Starting Materials | Mols | Grams |
|---|---|---|
| (a) Methyl Methacrylate | 2.6 | 260.0 |
| (b) Ethyl Acrylate | 5.0 | 500.0 |
| (c) Glycidyl Methacrylate | 1.7 | 240.0 |
| (d) Methacrylic Acid | 1.7 | 146.5 |
| (e) Xylene (1,000 ml.) | | |
| (f) Benzoyl Peroxide | | 10.0 |
| (g) Hydroquinone | | 0.2 |

The xylene is heated to 130° C. under a nitrogen blanket and stirred continuously. The monomers (a), (b) and (c) and the reaction initiator (f) are added to the xylene. The monomer (a), (b) and (c) are added separately and incrementally over a period of 3 hours. The charge is heated at 130°–133° C. for about 3 hours. The charge is cooled to about 50° C. The hydroquinone (g) is added to the charge. The methacrylic (d) is added to the charge and the temperature is raised to 138° C. gradually over a period of about 1.5 hours. This temperature is maintained for about 1 hour and the xylene is removed.

A paint binder is prepared by admixing the acrylic polymer thus formed (45.6%), styrene (17.2%) and methyl methacrylate (37.2%). A film of this binder is sprayed upon wood and metal panels and irradiated by an electron beam under the following conditions:

Potential—295 kv.
Current—1 milliampere
Atmosphere—helium
Line speed—6.5, 3.2 and 1.6 cm./sec.
Distance, emiter to workpiece—10 inches
Passes—2
Dose—2.5, 5 and 10 mrad For doses of 2.5, 5 and 10 mrad the Sward Hardness is 14, 30 and 30 respectively.

A mill base is prepared from the following ingredients:

| | Grams |
|---|---|
| TiO$_2$ | 70 |
| Acrylic resin, above prepared | 86.1 |
| Methyl methacrylate | 10.6 |

This mix is ground 24 hours in a ball mill to a fineness to about 8 Heg.

A paint is prepared by admixing the above mill base with styrene and additional methyl methacrylate, the paint having the following composition:

| | Grams |
|---|---|
| TiO$_2$ | 70 |
| Acrylic resin | 86.1 |
| Methyl methacrylate | 48.1 |
| Styrene | 11.7 |

This paint is sprayed upon wood and metal panels to form 1.5 mil coating and irradiated as before using a line speed of 6.5 cm./sec., 2 passes, for a total dose of about 2.5 mrad. The cured coating has a Sward Hardness of about 36.

EXAMPLE 2

A modified-acrylic resin is prepared as in the preceding example except that 0.6 mol of methyl methacrylate is replaced with 0.6 mol of styrene. A paint binder and a pigmented paint are prepared, sprayed and cured by irradiation as in the preceding example.

EXAMPLE 3

The procedure of Example 1 is repeated with the potential of the electron beam adjusted to about 175,000 electron volts. The exposure is controlled to provide a total dose equivalent to that of Example 1.

EXAMPLE 4

The procedure of Example 1 is repeated with the potential of the electron beam adjusted to about 400,000 electron volts. The exposure is controlled to provide a total dose equivalent to that of Example 1.

EXAMPLE 5

The procedure of Example 1 is repeated using the acrylic resin of Example 1 in varying amounts of vinyl monomers. The concentrations employed are as follows:

| Resin, percent | Styrene, percent | Methyl methacrylate, percent |
|---|---|---|
| 60 | 20 | 20 |
| 50 | 20 | 30 |
| 50 | 30 | 20 |
| 40 | 30 | 30 |

EXAMPLE 6

An acrylic paint binder resin is prepared from the following ingredients in the manner hereinafter set forth:

Starting materials:                    Parts by weight
 (a) Xylene _____ 600
 (b) Methyl methacrylate _____ 196
 (c) Ethyl acrylate _____ 333
 (d) Glycidyl methacrylate _____ 71
 (e) Azobisiso butyronitrile _____ 6
 (f) Hydroquinone _____ 0.12
 (g) Methacrylic acid _____ 42
 (h) Triethyl amine _____ 0.96

The reaction solvent, xylene, is charged to a flask fitted with a stirring rod, an addition funnel, a thermometer, a nitrogen inlet tube and a condenser. The amount of xylene is equal to the total weight of vinyl monomers to be added. The xylene is heated to reflux, nitrogen is bubbled through the solution during heat up and throughout the reaction. The combined monomers and initiator (azobisiso butyronitrile) is added to the refluxing solution evenly over a two-hour period. The initiator weight is 10 parts by weight per 1,000 parts by weight of vinyl monomers. The reaction solution is refluxed until the conversion of monomer to polymer is greater than 97 percent (8–16 hours).

In the second step, hydroquinone is added as an inhibitor and then the methacrylic acid is added to react with the residual epoxy groups on the polymer. Triethyl amine is used as a catalyst. This esterification reaction is carried out at reflux temperatures until 80 percent esterification is accomplished (determined by residual acid number). The xylene is then removed by vacuum distillation and the polymer dissolved in methyl methacrylate so that the weight ratio of polymer to solvent is two. The procedure of Example 1 following resin preparation is then repeated.

EXAMPLE 7

The procedure of Example 6 is repeated except that an equivalent amount of acrylic acid is substituted for the methacrylic acid.

EXAMPLE 8

The procedure of Example 6 is repeated except that the methacrylic acid component is substituted for the glycidyl methacrylate component in the first step of the procedure and glycidyl methacrylate is substituted for the methacrylic acid component in the second step of the procedure.

EXAMPLE 9

The procedure of Example 6 is repeated except that the vinyl monomer component of the paint binder solution is a mixture of methyl methacrylate, ethyl acrylate, butyl acrylate, butyl methacrylate and 2-ethyl hexyl methacrylate.

EXAMPLE 10

The procedure of Example 6 is repeated except that the vinyl monomer component of the paint binder solution is styrene.

EXAMPLE 11

The procedure of Example 6 is repeated except that the vinyl monomer component of the paint binder solution is a mixture of vinyl toluene, styrene, alphamethyl styrene and divinyl benzene.

EXAMPLE 12

The procedure of Example 6 is repeated except that the vinyl resin is prepared from the following ingredients in the manner hereinafter set forth.

Starting materials: Parts by weight
- (a) Ethyl acrylate _____ 38.8
- (b) Methyl methacrylate _____ 23.2
- (c) Allyl glycidyl ether _____ 37.0
- (d) Benzoyl peroxide _____ 1.0
- Xylene _____ Solvent

PROCEDURE

Step I

To a reaction vessel provided with a condenser, thermometer, agitator and dropping funnel there are charged an amount of xylene equal in weight to the reactants to be added in the first reaction step. The xylene is heated to about 100°–120° C. The reactants and catalyst are thoroughly mixed and added slowly with a dropping funnel to the heated xylene over a period of four hours. The reaction is held at this temperature for 1–2 hours after addition is complete and then allowed to cool to room temperature.

Step II

| | Parts by weight |
|---|---|
| Copolymer from Step I | 69.4 |
| Allyl alcohol | 30.4 |
| Potassium hydroxide | 0.2 |

A solution of the allyl alcoho land potassium hydroxide is added to the copolymer at room temperature. The mixture is then heated to a temperature of 100°–120° C. This temperature is maintained for about 7 hours and allowed to cool. The binder polymer reaction mixture is heated to about 60° C. and the xylene and excess reactant are removed by vacuum distillation. Styrene and hydroquinone are added to the polymer to form a film-forming solution having the following composition:

| | Parts by weight |
|---|---|
| Polymer from Step II | 66.66 |
| Styrene | 33.27 |
| Hydroquine | 0.07 |

EXAMPLE 13

The procedure of Example 6 is repeated except that the vinyl resin is prepared from the following ingredients in the manner hereinafter set forth:

Starting materials: Parts by weight
- (a) Ethyl acrylate _____ 39
- (b) Methyl methacrylate _____ 24
- (c) Allyl alcohol _____ 36
- (d) Benzoyl peroxide _____ 1
- Xylene _____ Solvent

PROCEDURE

Step I

To a reaction vessel provided with a condenser, thermometer, agitator, and dropping funnel there are charged an amount of xylene equal in weight to the reactants to be added in the first reaction step. The xylene is heated to about 100°–120° C. The reactants and the catalyst are thoroughly mixed and added slowly with a dropping funnel to the heated xylene over a period of four hours. The reaction is held at this temperature for 1–2 hours after addition is complete and then allowed to cool to room temperature.

Step II

| | Parts by weight |
|---|---|
| Copolymer from Step I | 69 |
| Allyl glycidyl ether | 30.8 |
| Potassium hydroxide | 0.2 |

A solution of the allyl glycidyl ether and potassium hydroxide is added to the copolymer at room temperature. The mixture is then heated to a temperature of 100°–120° C. This temperature is maintained for about 7 hours and allowed to cool. The binder polymer reaction mixture is heated to about 60° C. and the xylene and excess reactant are removed by vacuum distillation.

Styrene and hydroquinone are added to the polymer to form a film-forming solution having the following composition:

| | Parts by weight |
|---|---|
| Polymer from Step II | 67 |
| Styrene | 32.93 |
| Hydroquinone | 0.07 |

EXAMPLE 14

The procedure of Example 6 is repeated except that the vinyl resin is prepared from the following ingredients in the manner hereinafter set forth:

Step I

Starting materials: Parts by weight
- (a) Methyl methacrylate _____ 400
- (b) Ethyl acrylate _____ 400
- (c) Hydroxy ethyl methacrylate _____ 195
- (d) Toluene _____ 1000
- (e) Benzoyl peroxide _____ 30

The benzoyl peroxide is dissolved in a solution of the methyl methacrylate, ethyl acrylate and hydroxyethyl methacrylate and one-half of the toluene. This solution is added incrementally to the remainder of the toluene at reflux over a seven-hour period with a final pot temperature of about 138°–140° C. Reflux is maintained for another three hours and the solution cooled.

Step II

Starting materials: Parts by weight
- Solution from Step I _____ 500
- Acrylyl chloride _____ 33.8
- Toluene _____ 30

The solution from Step I is heated to 60° C. and a solution of the acrylyl chloride and toluene are added dropwise over a four hour period while the temperature is allowed to rise to about 90° C. After heating for another 2.5 hours, this solution is subjected to vacuum below 10 mm. Hg at 70° C. and the acrylic polymer is recovered.

EXAMPLE 15

The procedure of Example 6 is repeated except that the vinyl resin is prepared from the following ingredients in the manner hereinafter set forth: 100 parts by weight of a styrene-allyl alcohol copolymer containing 21.4 weight percent allyl alcohol and having an average molecular weight of about 1,620 and 0.1 part by weight hydroquinone are dissolved in toluene and heated to 90° C. and 41.8 parts by weight of methacrylyl chloride in toluene added dropwise over a one-hour period. Heating is continued and the temperature allowed to rise to toluene reflux until essentially complete cessation of gas liberation is obtained after an additional five hours. Infrared analysis shows about 10% residual hydroxyl. The solvent is removed and a solution of the polymer in vinyl monomers is formed.

EXAMPLE 16

The procedure of Example 6 is repeated except that the vinyl resin is prepared from the following ingredients in the manner hereinafter set forth: 250 parts by weight of a 25% nonvolatiles solution of solution polymerized polyvinylacetate supplied in a blend of about 85% toluene and 15% methanol are placed in a 1 liter flask equipped for distillation, agitation and dropwise solvent addition. The polyvinylacetate is hydrolyzed to contain about 3.5% hydroxyl. Methanol is removed as the toluene azeotrope and additional toluene added to maintain volume. After completion of methanol removal, the solution is maintained at reflux and 16 parts by weight of methacrylyl chloride in 20 parts by weight of dry dioxane added dropwise over one-half hour. Heating is continued for an additional four hours. Toluene is added during distillation and the excess acid chloride and excess toluene are removed. The resultant resin is used to form a film-forming solution with vinyl monomers as in the previous examples.

EXAMPLE 17

The procedure of Example 6 is repeated except that the depth of coating is varied in separate tests using films of 0.2, 0.5, 1.0, 2.0 and 3.5 mils. Irradiation is continued until tack-free films are achieved.

The abbreviation mrad as employed herein means 1,000,000 rad. The term "rad" as employed herein means that dose of radiation which results in the absorption of 100 ergs of energy per gram of absorber, e.g. coating film. The electron emitting means may be a linear electron accelerator capable of producing a direct current potential in the range hereinbefore set forth. In such a device electrons are ordinarily emitted from a hot filament and accelerated through a uniform voltage gradient. The electron beam may then be scanned to make a fan-shaped beam and then passed through a metal window, e.g. aluminum, an aluminum alloy with minor amounts of copper, a magnesium-thorium alloy, etc. These are conventionally about 0.003 inch in thickness.

It will be understood by those skilled in the art that modifications can be made within the foregoing examples within the scope of this invention as hereinbefore described and hereinafter claimed.

We claim:
1. An article of manufacture comprising a substrate and an adherent coating of paint of average depth in the range of about 0.1 to about 4.0 mils on an external surface thereof, said coating comprising the in situ formed polymerization product of a film-forming solution of vinyl monomers and an alpha-beta olefinically unsaturated vinyl copolymer having an average molecular weight above 1,000 crosslinked on said surface by ionizing radiation, said vinyl copolymer being further characterized in that a major proportion of the molecular weight thereof is derived from acrylic monomers and said alpha-beta olefinic unsaturation is limited to a concentration in the range of about 0.5 to about 5 units per 1,000 units molecular weight.

2. An article of manufacture in accordance with claim 1 wherein said alpha-beta olefinic unsaturation is limited to a concentration in the range of about 0.5 to about 3 units per 1,000 units molecular weight.

3. An article of manufacture in accordance with claim 1 wherein said ionizing radiation is an electron beam having an average energy in the range of about 150,000 to about 450,000 electron volts.

4. An article of manufacture in accordance with claim 1 wherein said acrylic monomers are a mixture of a minor proportion of acrylic acid or methacrylic acid and a major proportion of esters of said acids and a monohydric or dihydric alcohol.

5. An article of manufacture in accordance with claim 1 wherein a major proportion of said vinyl monomers are vinyl hydrocarbon monomers.

6. An article of manufacture in accordance with claim 1 wherein a major proportion of said vinyl monomers are esters of acrylic or methacrylic acid.

7. An article of manufacture comprising a substrate and an adherent coating of paint of average depth in the range of about 0.1 to about 4.0 mils on an external surface thereof, said coating comprising the in situ formed polymerization product of a film-forming solution of vinyl monomers and an alpha-beta olefinically unsaturated vinyl copolymer having an average molecular weight above 1,000 crosslinked on said surface by ionizing radiation, said vinyl copolymer being further characterized in that said alpha-beta olefinic unsaturation is limited to a concentration in the range of about 0.5 to about 3 units per 1,000 units molecular weight and is formed by first copolymerizing a minor amount of glycidyl methacrylate and a major amount of esters of acrylic acid or methacrylic acid and subsequently reacting the resultant copolymer with acrylic acid or methacrylic acid.

8. An article of manufacture comprising a substrate and an adherent coating of paint of average depth in the range of about 0.1 to about 4.0 mils on an external surface thereof, said coating comprising the in situ formed polymerization product of a film-forming solution of vinyl monomers and an alpha-beta olefinicaly unsaturated vinyl copolymer having an average molecular weight above 1,000 crosslinked on said surface by ionizing radiation, said vinyl copolymer being further characterized in that said alpha-beta olefinic unsaturation is limited to a concentration in the range of about 0.5 to about 3 units per 1,000 units molecular weight and is formed by first copolymerizing esters of acrylic acid or methacrylic acid and acrylic acid or methacrylic acid and subsequently reacting the resultant copolymer with glycidyl methacrylate.

9. A paint comprising a film-forming solution of about 15 to about 85 parts by weight of vinyl monomers and about 85 to about 15 parts by weight of an alpha-beta olefinically unsaturated vinyl copolymer having an average molecular weight above 1,000 and being further characterized in that a major proportion of the molecular weight thereof is derived from acrylic monomers and said alpha-beta olefinic unsaturation is limited to a concentration in the range of about 0.5 to about 5 units per 1,000 units molecular weight.

10. A paint in accordance with claim 9 wherein said alpha-beta olefinic unsaturation is limited to a concentration in the range of about 0.5 to about 3 units per 1,000 units molecular weight.

11. A paint in accordance with claim 9 wherein said acrylic monomers are a mixture of a minor proportion of acrylic acid or methacrylic acid and a major proportion of esters of said acids and a monohydric or dihydric alcohol.

12. A paint in accordance with claim 9 wherein a major proportion of said vinyl monomers are vinyl hydrocarbon monomers.

13. A paint in accordance with claim 9 wherein a major proportion of said vinyl monomers are esters of acrylic or methacrylic acid.

14. A paint comprising a film-forming solution of about 30 to about 70 parts by weight of vinyl monomers and about 70 to about 30 parts by weight of an alpha-beta olefinically unsaturated vinyl copolymer having an average molecular weight above 1,000 and being further characterized in that said alpha-beta olefinic unsaturation is limited to a concentration in the range of about 0.5 to about 3 units per 1,000 units molecular weight and is formed by first copolymerizing a minor amount of glycidyl methacrylate and a major amount of esters of acrylic acid or methacrylic acid and subsequently reacting the resultant copolymer with acrylic acid or methacrylic acid.

15. A paint comprising a film-forming solution of about 30 to about 70 parts by weight of vinyl monomers and about 70 to about 30 parts by weight of an alpha-beta olefinically unsaturated vinyl copolymer having an average molecular weight above 1,000 and being further characterized in that said alpha-beta olefinic unsaturation is limited to a concentration in the range of about 0.5 to about 3 units per 1,000 units molecular weight and is formed by first copolymerizing a minor amount of acrylic or methacrylic acid and a major amount of esters of acrylic or methacrylic acid and subsequently reacting the resultant copolymer with glycidyl methacrylate.

References Cited

UNITED STATES PATENTS

| | | | |
|---|---|---|---|
| 2,413,973 | 10/1942 | Howk | 204—159.16 |
| 2,900,277 | 8/1959 | Schmitz et al. | 204—159.13 |
| 3,290,410 | 12/1966 | Bader et al. | 260—885 |
| 3,317,635 | 5/1967 | Osmond et al. | 260—885 |
| 3,355,415 | 11/1967 | Worrall | 260—885 |
| 3,359,129 | 12/1967 | Mao | 117—93.31 |
| 3,364,282 | 1/1968 | D'Alelio | 260—885 |
| 3,393,183 | 7/1968 | Hicks et al. | 260—885 X |

FOREIGN PATENTS

| | | |
|---|---|---|
| 949,191 | 2/1964 | Great Britain. |
| 1,242,919 | 8/1960 | France. |

ALFRED L. LEAVITT, Primary Examiner

J. H. NEWSOME, Assistant Examiner

U.S. Cl. X.R.

117—161; 204—159.16; 260—885